United States Patent
Gottschalk, Jr. et al.

(10) Patent No.: US 9,235,728 B2
(45) Date of Patent: Jan. 12, 2016

(54) SYSTEM AND METHODS FOR IDENTIFYING COMPROMISED PERSONALLY IDENTIFIABLE INFORMATION ON THE INTERNET

(75) Inventors: Harold E. Gottschalk, Jr., El Cajon, CA (US); Michael Caldwell, Ramona, CA (US); Joel Carleton, San Diego, CA (US)

(73) Assignee: CSIDENTITY CORPORATION, Austin, TX (US)

( * ) Notice: Subject to any disclaimer, the term of this patent is extended or adjusted under 35 U.S.C. 154(b) by 272 days.

(21) Appl. No.: 13/398,471

(22) Filed: Feb. 16, 2012

(65) Prior Publication Data

US 2012/0215758 A1 Aug. 23, 2012

Related U.S. Application Data

(60) Provisional application No. 61/444,433, filed on Feb. 18, 2011.

(51) Int. Cl.
*G06F 7/00* (2006.01)
*G06F 21/62* (2013.01)
*G06F 17/30* (2006.01)
*H04L 29/06* (2006.01)

(52) U.S. Cl.
CPC ...... *G06F 21/6245* (2013.01); *G06F 17/30867* (2013.01); *H04L 63/1441* (2013.01)

(58) Field of Classification Search
CPC .................................................. G06F 17/30867
USPC .......................................................... 707/687
See application file for complete search history.

(56) References Cited

U.S. PATENT DOCUMENTS

| | | | |
|---|---|---|---|
| 3,752,904 | A | 8/1973 | Waterbury |
| 5,913,196 | A | 6/1999 | Talmor et al. |
| 5,987,440 | A | 11/1999 | O'Neil et al. |
| 5,999,940 | A | 12/1999 | Ranger |
| 6,125,985 | A | 10/2000 | Amdahl et al. |
| 6,142,283 | A | 11/2000 | Amdahl et al. |
| 6,144,988 | A | 11/2000 | Kappel |
| 6,249,228 | B1 | 6/2001 | Shirk et al. |

(Continued)

FOREIGN PATENT DOCUMENTS

WO WO-2009062111 A1 5/2009

OTHER PUBLICATIONS

Copenheaver, Blaine R., "International Search Report" for PCT/US2012/025456 as mailed May 21, 2012, 4 pages.
Young, Lee W., "International Search Report" prepared for PCT/US11/33940 as mailed Aug. 22, 2011, 3 pages.
Ross, et al., U.S. Appl. No. 13/093,664, filed Apr. 25, 2011.
Gottschalk, Jr., U.S. Appl. No. 13/236,687, filed Sep. 20, 2011.

(Continued)

*Primary Examiner* — Ajith Jacob
(74) *Attorney, Agent, or Firm* — Winstead PC

(57) ABSTRACT

In one embodiment, a method includes generating, by a computer system, a search-engine query from stored identity-theft nomenclature. The method also includes querying, by the computer system, at least one search engine via the search-engine query. Further, the method includes crawling, by the computer system, at least one computer-network resource identified via the querying. In addition, the method includes collecting, by the computer system, identity-theft information from the at least one computer-network resource. Additionally, the method includes processing, by the computer system, the identity-theft information for compromised personally-identifying information (PII).

24 Claims, 5 Drawing Sheets

(56) References Cited

U.S. PATENT DOCUMENTS

| | | |
|---|---|---|
| 6,263,447 B1 | 7/2001 | French et al. |
| 6,269,349 B1 | 7/2001 | Aieta et al. |
| 6,282,658 B2 | 8/2001 | French et al. |
| 6,292,795 B1 | 9/2001 | Peters et al. |
| 6,321,339 B1 | 11/2001 | French et al. |
| 6,448,889 B1 | 9/2002 | Hudson |
| 6,456,984 B1 | 9/2002 | Demoff et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,532,459 B1 | 3/2003 | Berson |
| 6,553,495 B1 | 4/2003 | Johansson et al. |
| 6,612,488 B2 | 9/2003 | Suzuki |
| 6,700,220 B2 | 3/2004 | Bayeur et al. |
| 6,740,875 B1 | 5/2004 | Ishikawa et al. |
| 6,751,626 B2 | 6/2004 | Brown et al. |
| 6,811,082 B2 | 11/2004 | Wong |
| 6,829,711 B1 | 12/2004 | Kwok et al. |
| 6,857,073 B2 | 2/2005 | French et al. |
| 6,866,586 B2 | 3/2005 | Oberberger et al. |
| 6,871,287 B1 | 3/2005 | Ellingson |
| 6,913,194 B2 | 7/2005 | Suzuki |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,965,997 B2 | 11/2005 | Dutta |
| 6,973,575 B2 | 12/2005 | Arnold |
| 6,983,882 B2 | 1/2006 | Cassone |
| 6,991,174 B2 | 1/2006 | Zuili |
| 6,993,659 B2 | 1/2006 | Milgramm et al. |
| 7,028,052 B2 | 4/2006 | Chapman et al. |
| 7,035,855 B1 | 4/2006 | Kilger et al. |
| 7,083,090 B2 | 8/2006 | Zuili |
| 7,092,891 B2 | 8/2006 | Maus et al. |
| 7,104,444 B2 | 9/2006 | Suzuki |
| 7,174,335 B2 | 2/2007 | Kameda |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,363 B1 | 7/2007 | Ellingson |
| 7,254,560 B2 | 8/2007 | Singhal |
| 7,272,857 B1 | 9/2007 | Everhart |
| 7,289,607 B2 | 10/2007 | Bhargava et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,340,042 B2 | 3/2008 | Cluff et al. |
| 7,370,044 B2 | 5/2008 | Mulhern et al. |
| 7,386,448 B1 | 6/2008 | Poss et al. |
| 7,392,534 B2 | 6/2008 | Lu et al. |
| 7,398,915 B1 | 7/2008 | Pineda-Sanchez et al. |
| 7,438,226 B2 | 10/2008 | Helsper et al. |
| 7,458,508 B1 | 12/2008 | Shao et al. |
| 7,466,235 B1 | 12/2008 | Kolb et al. |
| 7,480,631 B1 | 1/2009 | Merced et al. |
| 7,481,363 B1 | 1/2009 | Zuili |
| 7,490,052 B2 | 2/2009 | Kilger et al. |
| 7,497,374 B2 | 3/2009 | Helsper et al. |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,740 B2 | 6/2009 | Greene et al. |
| 7,548,886 B2 | 6/2009 | Kirkland et al. |
| 7,552,467 B2 | 6/2009 | Lindsay |
| 7,562,814 B1 | 7/2009 | Shao et al. |
| 7,568,616 B2 | 8/2009 | Zuili |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,229 B1 | 10/2009 | Kornegay et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,921 B2 | 2/2010 | Proux et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,701,364 B1 | 4/2010 | Zilberman |
| 7,707,163 B2 | 4/2010 | Anzalone et al. |
| 7,708,200 B2 | 5/2010 | Helsper et al. |
| 7,711,636 B2 | 5/2010 | Robida et al. |
| 7,720,750 B2 | 5/2010 | Brody et al. |
| 7,735,125 B1 | 6/2010 | Alvarez et al. |
| 7,742,982 B2 | 6/2010 | Chaudhuri et al. |
| 7,747,559 B2 | 6/2010 | Leitner et al. |
| 7,752,236 B2 | 7/2010 | Williams et al. |
| 7,752,554 B2 | 7/2010 | Biggs et al. |
| 7,761,384 B2 | 7/2010 | Madhogarhia |
| 7,774,270 B1 | 8/2010 | MacCloskey |
| 7,779,456 B2 | 8/2010 | Dennis et al. |
| 7,779,457 B2 | 8/2010 | Taylor |
| 7,788,184 B2 | 8/2010 | Kane |
| 7,792,864 B1 | 9/2010 | Rice |
| 7,793,835 B1 | 9/2010 | Coggeshall et al. |
| 7,801,828 B2 | 9/2010 | Candella et al. |
| 7,805,391 B2 | 9/2010 | Friedlander et al. |
| 7,840,459 B1 | 11/2010 | Loftesness et al. |
| 7,860,769 B2 | 12/2010 | Benson |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,874,488 B2 | 1/2011 | Parkinson |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens |
| 7,933,835 B2 | 4/2011 | Keane et al. |
| 7,950,577 B1 | 5/2011 | Daniel |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,971,246 B1 | 6/2011 | Emigh et al. |
| 7,975,299 B1 | 7/2011 | Balducci et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,271 B2 | 9/2011 | Grant |
| 8,027,518 B2 | 9/2011 | Baker et al. |
| 8,028,168 B2 | 9/2011 | Smithies et al. |
| 8,028,326 B2 | 9/2011 | Palmer et al. |
| 8,028,329 B2 | 9/2011 | Whitcomb |

(56) References Cited

U.S. PATENT DOCUMENTS

| | | |
|---|---|---|
| 8,028,896 B2 | 10/2011 | Carter et al. |
| 8,032,449 B2 | 10/2011 | Hu et al. |
| 8,032,927 B2 | 10/2011 | Ross |
| 8,037,512 B2 | 10/2011 | Wright et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,915 B2 | 11/2011 | Voice et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 2002/0019938 A1 | 2/2002 | Aarons |
| 2002/0042879 A1 | 4/2002 | Gould et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0080256 A1 | 6/2002 | Bates et al. |
| 2002/0087460 A1 | 7/2002 | Hornung |
| 2002/0130176 A1 | 9/2002 | Suzuki |
| 2002/0138751 A1 | 9/2002 | Dutta |
| 2002/0173994 A1 | 11/2002 | Ferguson |
| 2002/0184509 A1 | 12/2002 | Scheidt et al. |
| 2003/0004879 A1 | 1/2003 | Demoff et al. |
| 2003/0009426 A1 | 1/2003 | Ruiz-Sanchez |
| 2003/0046554 A1 | 3/2003 | Leydier et al. |
| 2003/0048904 A1 | 3/2003 | Wang et al. |
| 2003/0057278 A1 | 3/2003 | Wong |
| 2003/0070101 A1 | 4/2003 | Buscemi |
| 2003/0143980 A1 | 7/2003 | Choi et al. |
| 2003/0149744 A1 | 8/2003 | Bierre et al. |
| 2003/0200447 A1 | 10/2003 | Sjoblom |
| 2003/0222500 A1 | 12/2003 | Bayeur et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0026496 A1 | 2/2004 | Zuili |
| 2004/0111335 A1 | 6/2004 | Black et al. |
| 2004/0149820 A1 | 8/2004 | Zuili |
| 2004/0149827 A1 | 8/2004 | Zuili |
| 2004/0153656 A1 | 8/2004 | Cluts et al. |
| 2004/0153663 A1 | 8/2004 | Clark et al. |
| 2004/0158723 A1 | 8/2004 | Root |
| 2004/0230538 A1 | 11/2004 | Clifton et al. |
| 2004/0243514 A1 | 12/2004 | Wankmueller |
| 2004/0243539 A1 | 12/2004 | Skurtovich et al. |
| 2004/0243567 A1 | 12/2004 | Levy |
| 2004/0250085 A1 | 12/2004 | Tattan et al. |
| 2004/0254868 A1 | 12/2004 | Kirkland et al. |
| 2005/0001028 A1 | 1/2005 | Zuili |
| 2005/0005168 A1* | 1/2005 | Dick .................... 713/201 |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0065874 A1 | 3/2005 | Lefner et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0097364 A1 | 5/2005 | Edeki et al. |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154671 A1 | 7/2005 | Doan et al. |
| 2005/0165667 A1 | 7/2005 | Cox |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0242173 A1 | 11/2005 | Suzuki |
| 2005/0273333 A1 | 12/2005 | Morin et al. |
| 2005/0279869 A1 | 12/2005 | Barklage |
| 2006/0004622 A1 | 1/2006 | Fanelli et al. |
| 2006/0004663 A1 | 1/2006 | Singhal |
| 2006/0041464 A1 | 2/2006 | Powers et al. |
| 2006/0045105 A1 | 3/2006 | Dobosz et al. |
| 2006/0064374 A1 | 3/2006 | Helsper et al. |
| 2006/0074798 A1 | 4/2006 | Din et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129840 A1 | 6/2006 | Milgramm et al. |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0178971 A1 | 8/2006 | Owen et al. |
| 2006/0179004 A1 | 8/2006 | Fuchs |
| 2006/0200855 A1 | 9/2006 | Willis |
| 2006/0204051 A1 | 9/2006 | Holland |
| 2006/0206725 A1 | 9/2006 | Milgramm et al. |
| 2006/0239512 A1 | 10/2006 | Petrillo |
| 2006/0239513 A1 | 10/2006 | Song et al. |
| 2006/0253583 A1 | 11/2006 | Dixon et al. |
| 2006/0255914 A1 | 11/2006 | Westman |
| 2006/0271456 A1 | 11/2006 | Romain et al. |
| 2006/0271457 A1 | 11/2006 | Romain et al. |
| 2006/0271507 A1 | 11/2006 | Anzalone et al. |
| 2006/0271568 A1 | 11/2006 | Balkir et al. |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287902 A1 | 12/2006 | Helsper et al. |
| 2006/0294023 A1 | 12/2006 | Lu |
| 2007/0011100 A1 | 1/2007 | Libin et al. |
| 2007/0016521 A1 | 1/2007 | Wang |
| 2007/0016522 A1 | 1/2007 | Wang |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0061273 A1 | 3/2007 | Greene et al. |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0083460 A1 | 4/2007 | Bachenheimer |
| 2007/0087795 A1 | 4/2007 | Aletto et al. |
| 2007/0100774 A1 | 5/2007 | Abdon |
| 2007/0106517 A1 | 5/2007 | Cluff et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0124270 A1 | 5/2007 | Page |
| 2007/0155411 A1 | 7/2007 | Morrison |
| 2007/0157299 A1 | 7/2007 | Hare |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192853 A1 | 8/2007 | Shraim et al. |
| 2007/0198410 A1 | 8/2007 | Labgold et al. |
| 2007/0205266 A1 | 9/2007 | Carr et al. |

(56) References Cited

U.S. PATENT DOCUMENTS

| | | |
|---|---|---|
| 2007/0214037 A1 | 9/2007 | Shubert et al. |
| 2007/0214076 A1 | 9/2007 | Robida et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0233614 A1 | 10/2007 | McNelley et al. |
| 2007/0234427 A1 | 10/2007 | Gardner et al. |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0291995 A1 | 12/2007 | Rivera |
| 2007/0292006 A1 | 12/2007 | Johnson |
| 2007/0294104 A1 | 12/2007 | Boaz et al. |
| 2008/0027857 A1 | 1/2008 | Benson |
| 2008/0027858 A1 | 1/2008 | Benson |
| 2008/0059236 A1 | 3/2008 | Cartier |
| 2008/0059352 A1 | 3/2008 | Chandran |
| 2008/0059366 A1 | 3/2008 | Fou |
| 2008/0076386 A1 | 3/2008 | Khetawat et al. |
| 2008/0098222 A1 | 4/2008 | Zilberman |
| 2008/0103799 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0162383 A1 | 7/2008 | Kraft |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208726 A1 | 8/2008 | Tsantes et al. |
| 2008/0217400 A1 | 9/2008 | Portano |
| 2008/0244717 A1 | 10/2008 | Jelatis et al. |
| 2008/0256613 A1 | 10/2008 | Grover |
| 2008/0288430 A1 | 11/2008 | Friedlander et al. |
| 2008/0288790 A1 | 11/2008 | Wilson |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024636 A1 | 1/2009 | Shiloh |
| 2009/0026270 A1 | 1/2009 | Connell, II et al. |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1 | 4/2009 | Dupray et al. |
| 2009/0119299 A1 | 5/2009 | Rhodes |
| 2009/0125439 A1 | 5/2009 | Zarikian et al. |
| 2009/0126013 A1 | 5/2009 | Atwood et al. |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0204457 A1 | 8/2009 | Buhrmann et al. |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0222362 A1 | 9/2009 | Stood et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0307778 A1 | 12/2009 | Mardikar |
| 2009/0326972 A1 | 12/2009 | Washington |
| 2009/0328173 A1 * | 12/2009 | Jakobson et al. ............... 726/7 |
| 2010/0004965 A1 | 1/2010 | Eisen |
| 2010/0024037 A1 * | 1/2010 | Grzymala-Busse et al. .... 726/26 |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0095357 A1 | 4/2010 | Willis et al. |
| 2010/0100406 A1 | 4/2010 | Lim |
| 2010/0131273 A1 | 5/2010 | Aley-Raz et al. |
| 2010/0132043 A1 | 5/2010 | Bjorn et al. |
| 2010/0145847 A1 | 6/2010 | Zarikian et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0205662 A1 | 8/2010 | Ibrahim et al. |
| 2010/0218255 A1 | 8/2010 | Ritman et al. |
| 2010/0229225 A1 | 9/2010 | Sarmah et al. |
| 2010/0229230 A1 | 9/2010 | Edeki et al. |
| 2010/0241501 A1 | 9/2010 | Marshall |
| 2010/0250364 A1 | 9/2010 | Song et al. |
| 2010/0250411 A1 | 9/2010 | Ogrodski |
| 2010/0275265 A1 | 10/2010 | Fiske et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325442 A1 | 12/2010 | Petrone et al. |
| 2010/0332292 A1 | 12/2010 | Anderson |
| 2011/0016042 A1 | 1/2011 | Cho et al. |
| 2011/0040983 A1 | 2/2011 | Grzymala-Busse et al. |
| 2011/0060905 A1 | 3/2011 | Stack et al. |
| 2011/0119291 A1 | 5/2011 | Rice |
| 2011/0126024 A1 | 5/2011 | Beatson et al. |
| 2011/0270727 A1 | 11/2011 | Kasower |
| 2011/0276496 A1 | 11/2011 | Neville et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2013/0004033 A1 | 1/2013 | Trugenberger et al. |

OTHER PUBLICATIONS

Lefebvre, F. et al., "A Robust Soft Hash Algorithm for Digital Image Signature", IEEE, 2003, pp. 495-498.

Khan, Muhammad Khurram, "An Efficient and Secure Remote Mutual Authentication Scheme with Smart Cards", IEEE, 2008, pp. 1-6.

Aad, Imad, et al.; "NRC Data Collection and the Privacy by Design Principles"; IEEE, Nov. 2010; 5 pages.

Haglund, Christoffer; "Two-Factor Authentication with a Mobile Phone"; Fox Technologies, Uppsala, Department of Information Technology, Lund University; Nov. 2, 2007; 62 pages.

* cited by examiner

SYSTEM AND METHODS FOR IDENTIFYING COMPROMISED PERSONALLY IDENTIFIABLE INFORMATION ON THE INTERNET

CROSS-REFERENCE TO RELATED APPLICATIONS

This application claims priority from, and incorporates by reference the entire disclosure of, U.S. Provisional Application No. 61/444,433 filed on Feb. 18, 2011.

BACKGROUND

1. Technical Field

The present invention relates generally to the field of identity theft and more specifically, but not by way of limitation, to data mining of personally-identifying information found on the Internet.

2. History of Related Art

Identity theft is a mounting concern in commercial transactions. This is particularly true in remote commercial transactions such as, for example, Internet-shopping transactions, that involve little or no direct personal contact between a consumer and a goods or services provider (GSP). It is commonplace for personally-identifying information (PII) to be compromised and utilized for identity theft such as, for example, in a remote commercial transaction. PII, as used herein, refers to information that can be used to uniquely identify, contact, or locate an individual person or can be used with other sources to uniquely identify, contact, or locate an individual person. PII may include, but is not limited to, social security numbers (SSN), bank or credit card account numbers, passwords, birth dates, and addresses. PII that has been obtained by or made available to a third party without proper authorization is referred to herein as compromised PII.

PII can be compromised in a myriad of ways. For example, record keeping for entities such as, for example, healthcare, governmental, financial, and educational institutions, is increasingly and sometimes exclusively electronic. Electronic record keeping introduces new risks for which the entities are frequently ill-equipped to handle. For example, PII is often compromised via stolen hardware, inadequate security procedures, security breaches, or employee carelessness or misconduct.

Another way that PII is frequently compromised is via "phishing." Phishing is the process of attempting to acquire PII by masquerading as a trustworthy entity in an electronic communication. A common example of phishing is a fraudulent email that is made to appear as though it originates from a valid source such as, for example, a national bank. The fraudulent email may incorporate a uniform resource locator (URL) that re-directs its audience to a false website that appears to be a legitimate website for the valid source. In actuality, the false website may be a front for stealing PII as part of a spurious transaction. For example, the false website may request "confirmation" of PII such as, for example, a credit card number or a username and password. The PII may then be stored for later improper use such as, for example, identity theft in a remote commercial transaction.

At least 182,395 instances of phishing were recorded during 2009, as reported by antiphishing.org. This is a forty-two percent increase over a number recorded in 2008. More than 10,745 malicious domains were registered in 2009, which is an increase of fifty-two percent over 2008. Sometimes, a misleading link such as, for example, the URL for the false website described above, may actually originate from a legitimate website but cause traffic to be redirected to an illegitimate website. This type of scam is known as "pharming."

Legislation to curb efforts to compromise PII are largely ineffective. For example, phishing and pharming activities originate from areas around the globe and are thus often protected from prosecution by a particular jurisdiction. Additionally, once PII is compromised, distribution of the compromised PII may be difficult or impossible to prevent. Web sites and forums dedicated to exchanging compromised PII are increasing rapidly in number. Some of these web sites and forums exchange compromised PII though email or secure direct uploads and downloads.

Identity theft resulting from compromised PII is costly to victims and companies alike. The Identity Fraud Survey Report created by Javelin Strategy & Research reported that in 2009 victims averaged a personal cost of $373 and 21 hours of time to resolve identity-theft issues. The annual cost of identity theft currently exceeds $200 billion worldwide. In addition, as a result of new legislation and litigation resulting from compromised PII, companies stand to suffer from lower profit margins, damaged credibility due to negative customer experiences, and eroded brand value. Identity theft also looms as a threat to the advancement of promising consumer-driven, self-service, and cost-savings technologies.

SUMMARY OF THE INVENTION

In one embodiment, a method includes generating, by a computer system, a search-engine query from stored identity-theft nomenclature. The method also includes querying, by the computer system, at least one search engine via the search-engine query. Further, the method includes crawling, by the computer system, at least one computer-network resource identified via the querying. In addition, the method includes collecting, by the computer system, identity-theft information from the at least one computer-network resource. Additionally, the method includes processing, by the computer system, the identity-theft information for compromised personally-identifying information (PII).

In one embodiment, a computer-program product includes a computer-usable medium having computer-readable program code embodied therein. The computer-readable program code is adapted to be executed to implement a method. The method includes generating, by a computer system, a search-engine query from stored identity-theft nomenclature. The method also includes querying, by the computer system, at least one search engine via the search-engine query. Further, the method includes crawling, by the computer system, at least one computer-network resource identified via the querying. In addition, the method includes collecting, by the computer system, identity-theft information from the at least one computer-network resource. Additionally, the method includes processing, by the computer system, the identity-theft information for compromised personally-identifying information (PII).

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

Figure 1:
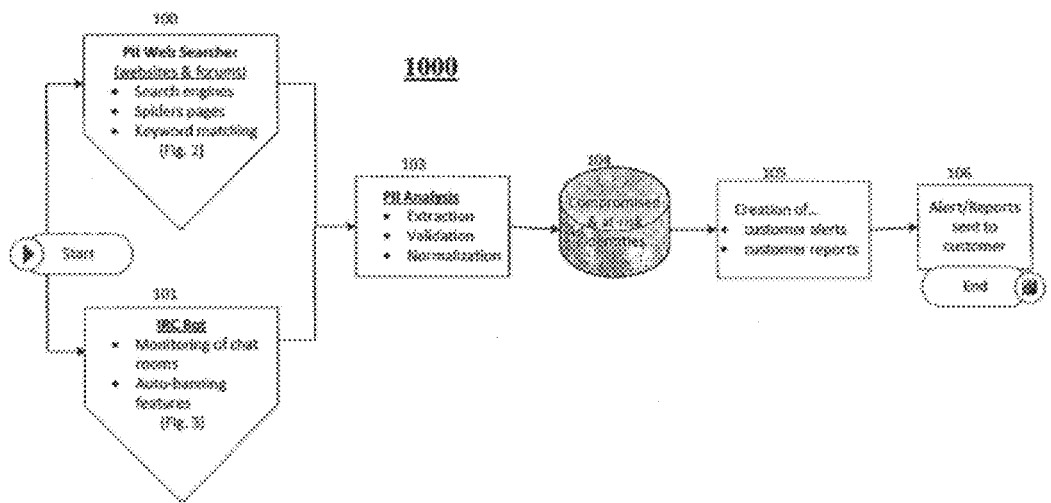
FIG. 1 illustrates a process of identifying compromised PII on the Internet.

FIG. 1 depicts an illustrative flow 1000 for identifying, analyzing, and reporting compromised PII on a computer network such as, for example, the Internet. In a typical embodiment, the flow 1000 may be initiated by one or both of a PII Web Searcher (PWS) 100 and an Internet Relay Chat Robot (IRC bot) 101. One of ordinary skill in the art will appreciate that the PWS 100 and the IRC bot 101 are illustrative in nature and that, in various embodiments, the flow 1000 may be initiated via other types of components that are operable to collect identity-theft information.

As used herein, identity theft generally involves a use of PII that is not authorized by an owner of the PII. Identity theft may include, for example, an unauthorized change to PII or an unauthorized use of PII to access resources or to obtain credit or other benefits. Identity-theft information, as used herein, includes any information that may be used to facilitate discovery or prevention of identity theft. Identity-theft information may include, for example, compromised PII and information related to where or how compromised PII may be found. Identity-theft nomenclature, as used herein, refers to words, phrases, nicknames, numbers, and the like that are determined to be suggestive of identity-theft information or identity theft. In various embodiments, identity-theft may include nomenclature for multiple languages (e.g., English and non-English words).

In various embodiments, the flow 1000 may be initiated via the PWS 100. The PWS 100 may utilize, for example, search engines, web spiders, and keyword-matching features. In a typical embodiment, the search engines and the web spiders may be utilized to collect identity-theft information such as, for example, potential sources of compromised PII. The potential sources of compromised PII may include, for example, websites and forums that facilitate exchange of compromised PII (e.g., by identity thieves). Further, keyword-matching features may be leveraged to analyze the potential sources of identity-theft information using, for example, identity-theft nomenclature. Additionally, the PWS 100 is generally operable to identify and collect other identity-theft information such as, for example, compromised PII, uniform resource locators (URLs), and references to IRC chat rooms (i.e., channels). An illustrative embodiment of the PWS 100 will be described with respect to FIG. 2.

In various embodiments, the flow 1000 may be initiated via the IRC bot 101. Oftentimes, compromised PII is exchanged via chat rooms (e.g., between identity thieves on IRC channels). In a typical embodiment, the IRC bot 101 is operable to crawl the Internet in search of chat rooms (e.g., IRC channels) that are frequented by identity thieves. In a typical embodiment, the IRC bot 101 is operable to monitor such chat rooms for identity-theft nomenclature. Furthermore, the IRC bot 101 is typically operable to identify and collect compromised PII, URLs, references to other IRC chat rooms, and other identity-theft information from such chat rooms. Illustrative embodiments of the IRC bot 101 will be described with respect to FIGS. 3, 4, 4A, and 4B.

Oftentimes, if a particular user in a chat room is inactive for a certain period of time, the particular user may be timed out either automatically or by an administrator. In a typical embodiment, the IRC bot 101 may invoke auto-banning features that are operable to maintain an active status and thereby prevent time-out. The auto-banning features may involve simulating a human chat. For example, the auto-banning features may initiate a chat via a generic greeting, reproduce a single word from a monitored conversation, and the like. In a typical embodiment, the simulation of human chat may additionally cause an identity thief to reveal additional identity-theft information such as, for example, compromised PII or a URL to a potential source for compromised PII.

In various embodiments, the IRC bot 101 and the PWS 100 may operate collaboratively in the flow 1000. For example, the IRC bot 101 may provide identity-theft nomenclature such as email addresses, nicknames, and other information that may be used by an identity thief. The IRC bot 101 may further provide, for example, URLs to potential sources of compromised PII. In a typical embodiment, the PWS 100 may crawl the URLs provided by the IRC bot 101 and scan for identity-theft information. The PWS 100 may also search and crawl the Internet using the identity-theft nomenclature provided by the IRC bot 101. In a similar manner, the PWS 100 may discover and send identity-theft information such as, for example, chat rooms, to the IRC bot 101. In a typical embodiment, the IRC bot 101 may monitor the chat rooms provided by the PWS 100.

After identity-theft information is collected by the IRC bot 101 and the PWS 100, the collected identity-theft information may be processed at step 103. In a typical embodiment, the processing of the collected identity-theft information may include an extraction process, a validation process, and a normalization process. In various embodiments, the PWS 100 and the IRC bot 101 may yield extensive amounts of identity-theft information that includes, for example, webpage segments, IRC logs, text files, and the like. In a typical embodiment, the extraction process and the validation process operate to intelligently reduce an amount of the collected identity-theft information that is stored and utilized in subsequent steps of the flow 1000. In a typical embodiment, the normalization process ensures that the identity-theft information is stored efficiently and effectively.

In a typical embodiment, as part of the extraction process, the collected identity-theft information may be processed for compromised PII by one or more parsers that recognize common formats for PII. For example, a parser may identify token-separated data (e.g., tab-delimited data). Similarly, a parser may determine a column type for columns lacking a column header, for example, by analyzing data that is present in particular columns (e.g., recognizing a list of text strings as email addresses). Furthermore, a parser may identify multi-line labeled data such as, for example, "first name: John," and various other labels that may be associated with compromised PII (e.g., recognizing "ccn," "cc" or "credit card" as possible labels for credit-card information). Additionally, by way of further example, a parser may identify identity-theft information taken from encodings that may be present on cards such as, for example, credit cards, driver's licenses, and the like. The encodings may include, for example, track 1 and track 2 magnetic-stripe data.

Additionally, as part of the extraction process, rules may be enforced that require groups of fields to be present in particular compromised PII before allowing the particular compromised PII to be recorded. In a typical embodiment, the requirement that groups of fields be present has the benefit of reducing "false positives" within compromised PII. False positives may be considered elements of compromised PII that are not deemed to be sufficiently private or sufficiently important to merit recordation. In a typical embodiment, false positives may be removed from the collected identity-theft information. For example, an email address that is not accompanied by a password may be considered a false positive and not recorded. In a typical embodiment, a rule may be established that requires, for example, a username or email address to be accompanied by a password in order to be recorded.

In a typical embodiment, the validation process involves analyzing a source of the collected identity-theft information such as, for example, compromised PII, and determining if any elements of the compromised PII are false positives. For example, in a typical embodiment, genealogy websites, phone/address lookup websites, and website log files are common sources of false positives. Compromised PII that is mined from such websites, in a typical embodiment, may be considered false positives and removed from the collected identity-theft information. Conversely, compromised PII mined, for example, from known hacker websites and websites replete with identity-theft nomenclature, in a typical embodiment, may be protected from identification as false positives.

In a typical embodiment, the normalization process ensures that the collected identity-theft information such as, for example, compromised PII, is stored according to a standardized format. For example, standardized data structures and attributes may be established for names, credit-card numbers, and the like. In a typical embodiment, the normalization process facilitates matching, for example, elements of compromised PII to particular individuals to whom the elements correspond. In that way, reports and alerts based on the compromised PII may be more efficiently and more accurately generated. In a typical embodiment, after the extraction process, the validation process, and the normalization process, the collected identity-theft information is recorded in a database at step 104.

At step 105, in a typical embodiment, alerts and reports may be delivered based on, for example, compromised PII that is stored in the database at step 104. In some embodiments, the recordation of any elements of compromised PII at step 104 merits delivery of an alert to an individual to whom the elements correspond. In other embodiments, an individual may only be delivered an alert if, for example, certain elements or combinations of elements are discovered and recorded (e.g., credit-card information or social-security-number). In a typical embodiment, a particular individual may be able to pre-specify an alert-delivery method (e.g., email, telephone, etc.). After step 105, the flow 1000 ends.

Figure 2:
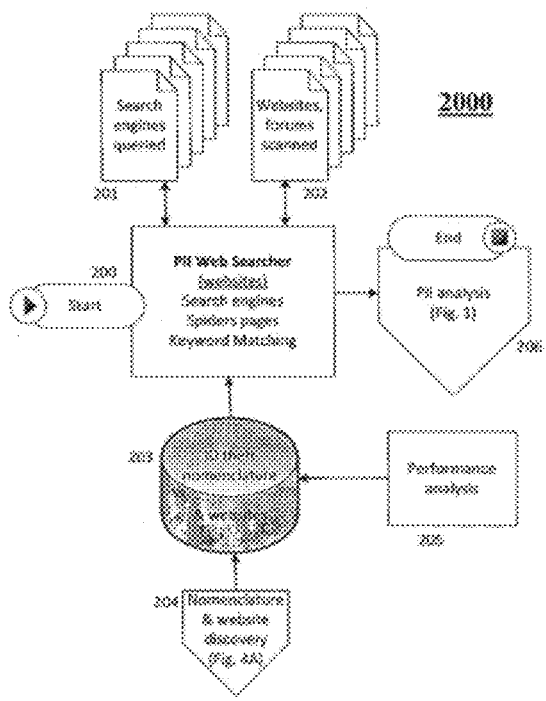
FIG. 2 illustrates a process of data mining for compromised PII using a PII Web Searcher.

FIG. 2 illustrates a flow 2000 for mining compromised PII via a PWS 200. In a typical embodiment, the PWS 200 is similar to the PWS 100 of FIG. 1. The PWS 200 typically accesses a database 203 that includes identity-theft nomenclature and identity-theft websites. Identity-theft websites are websites that have been identified via, for example, identity-theft nomenclature, to be possible sources of compromised PII. The database 203 is typically populated with identity-theft websites and identity-theft nomenclature via a discovery process 204. Illustrative embodiments of the discovery process 204 will be described in further detail with respect to FIG. 4A.

In a typical embodiment, the PWS 200 receives identity-theft nomenclature and identity-theft websites as input from the database 203. The PWS 200 typically queries search engines 201 via keywords from the identity-theft nomenclature. Additionally, the PWS 200 typically crawls websites 202 and scans the websites 202 for the identity-theft nomenclature. In a typical embodiment, the websites 202 include the identity-theft websites received as input from the database 203 and websites identified via queries to the search engines 201. At step 206, compromised PII collected by the PWS 200 may be processed at a processing step 206 in a manner similar to that described with respect to step 103 of FIG. 1.

As new websites and identity-theft nomenclature are added to the database 203 via, for example, the discovery process 204, the database 203 may be optimized via a performance-analysis process 205. In the performance-analysis 205, the identity-theft nomenclature is typically ranked according to a relative significance of compromised PII that is gleaned thereby. In a typical embodiment, the database 203 maintains, for each element of the identity-theft nomenclature, historical information related to compromised PII obtained via that element. In a typical embodiment, each element of the identity-theft nomenclature may be ranked, for example, according to an amount and/or a quality of the compromised PII obtained via that element.

The quality of the compromised PII may be determined, for example, by assigning weights based on a degree of sensitivity of particular elements of compromised PII. For example, in various embodiments, credit-card information and social security numbers may be assigned higher weights than, for example, website account information. In various embodiments, the amount of compromised PII may be, for example, an overall amount of compromised PII historically obtained via particular identity-theft nomenclature. Further, in various embodiments, the amount of compromised PII may be, for example, an amount of PII obtained via particular identity-theft nomenclature in a defined period of time. For example, in some embodiments, it may be advantageous to consider an amount of compromised PII obtained via particular identity-theft nomenclature within the last thirty days.

In a typical embodiment, a score may be computed for each element of identity-theft nomenclature based on, for example, an amount and/or a quality of the compromised PII that is gleaned thereby. In a typical embodiment, a scoring formula for generating the score is configurable. For example, weighting factors may be assigned to the amount and/or the quality of the compromised PII. In that way, greater or less weight may be assigned to the amount and/or the quality of the compromised PII, as may be desired for particular applications. Once scores are generated for each element of the identity-theft nomenclature, the identity-theft nomenclature may be ranked based on the scores.

In a typical embodiment, the PWS 200 may query the search engines 201 via keywords from the ranked identity-theft nomenclature in order to yield, for example, URLs to additional websites. The additional websites may be stored in the database 203. In a typical embodiment, the PWS 200 may crawl and scan the additional websites in a manner similar to that described above with regard to the websites 202. Further, compromised PII collected by the PWS 200 may be processed at a processing step 206 in a manner similar to that described with respect to step 103 of FIG. 1. After the performance-analysis process 205, the flow 2000 ends.

Figure 3:
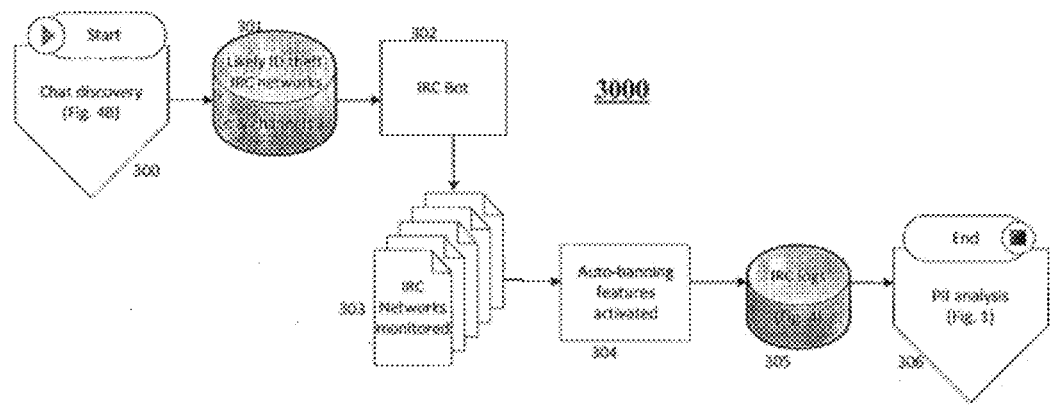
FIG. 3 illustrates a process of data mining for compromised PII using an Internet Relay Chat Robot (IRC Bot)

FIG. 3 illustrates a flow 3000 for compiling databases of compromised PII via an IRC bot. The flow 3000 begins via a chat-room-discovery process 300. During the chat-room-discover process 300, a database 301 is populated. The database 301, in a typical embodiment, includes URLs, for example, to IRC networks and channels likely to relate to identity theft. An illustrative embodiment of the chat-room-discovery process 300 will be described in more detail with respect to FIG. 4B.

In a typical embodiment, an IRC bot 302 receives URLs for IRC networks 303 as input from the database 301. The IRC bot 302 is generally similar to the IRC bot 101 of FIG. 1. The IRC bot 302 typically scans the IRC networks 303 for identity-theft information such as, for example, compromised PII. In a typical embodiment, the IRC bot 302 invokes one or more auto-banning features 304 in order to prevent being timed out on a particular IRC network due to inactivity. For example, the IRC bot 304 may simulate human interaction by interjecting text. In a typical embodiment, the IRC bot 304 is further operable to change Internet Protocol (IP) addresses in order explore IRC networks and chat rooms with efficiency.

Any compromised PII that is found by the IRC bot 302 is typically logged into an IRC log database 305. After being logged, in a typical embodiment, the compromised PII is processed at a processing step 306 in a manner similar to that described with respect to step 103 of FIG. 1. After the processing step 306, the flow 3000 ends.

Figure 4:
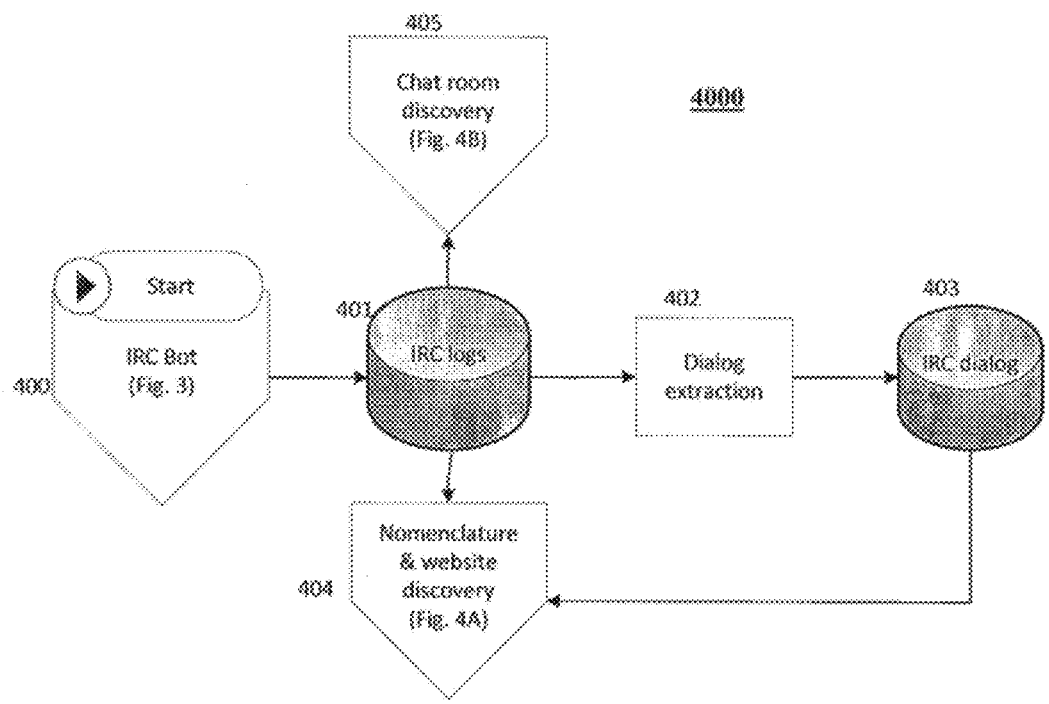
FIG. 4 illustrates a process of chat room, nomenclature and website discovery.

FIG. 4 depicts an illustrative flow 4000 for chat room and website discovery. In particular, the flow 4000 illustrates interactions between an IRC bot 400, a chat-room-discovery process 405, a nomenclature-and-website discovery process 404, a dialog-extraction process 402, an IRC log database 401, and an IRC dialog database 403. The IRC bot 400 is generally operable to scan chat rooms on IRC networks for compromised PII. In a typical embodiment, the IRC bot 400 is similar to the IRC bot 101 of FIG. 1 and the IRC bot 302 of FIG. 3.

After the chat rooms are scanned by the IRC bot 400 as described with respect to FIGS. 1 and 3, identity-theft information such as, for example, compromised PII, is typically logged into the IRC log database 401 as an IRC log. In a typical embodiment, the dialog-extraction process 402 is applied to the IRC log. The dialog-extraction process 402 is typically similar to the extraction process described with respect to step 103 of FIG. 1. In a typical embodiment, compromised PII that is extracted as part of the dialog-extraction process is stored in the IRC dialog database 403. In a typical embodiment, automated spam postings can be distinguished and separated from other dialog.

In a typical embodiment, the IRC log stored in the IRC log database 401 and the extracted compromised PII stored in the IRC dialog database 403 may be provided as inputs to the nomenclature-and-website discover process 404. In a typical embodiment, the nomenclature-and-website discover process 404 discovers new websites and identity-theft nomenclature that may be utilized, for example, by the IRC bot 400, to acquire additional identity-theft information. An illustrative embodiment of the nomenclature-and-website discovery process 404 will be described in more detail with respect to FIG. 4A.

In a typical embodiment, the IRC log stored in the IRC log database 401 may be provided as input to the chat-room-discovery process 405. Although not illustrated, in various embodiments, the extracted compromised PII stored in the IRC dialog database 403 may also be provided as input to the chat-room-discovery process 405. In a typical embodiment, the chat-room-discovery process 405 analyzes the IRC log in order to identify, for example, references to new chat rooms on IRC networks that may be sources of compromised PII. An illustrative embodiment of the chat-room-discovery process 405 will be described with respect to FIG. 4B.

Figure 4A:
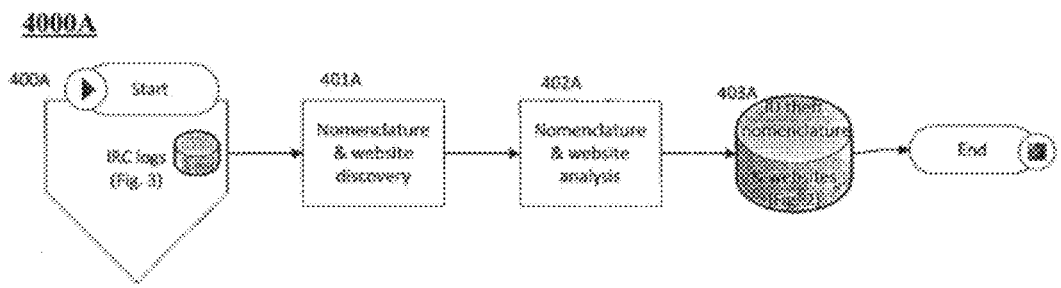
FIG. 4A illustrates a process of nomenclature and website discovery.

FIG. 4A is an illustrative flow 4000A for nomenclature and website discovery. The flow 4000A typically begins with an IRC bot 400A. In a typical embodiment, the IRC bot 400A is similar to the IRC bot 400 of FIG. 4, the IRC bot 300 of FIG. 3, and the IRC bot 101 of FIG. 1. At a discovery step 401A, an IRC log generated by the IRC bot 400A may be analyzed for new identity-theft nomenclature and new websites. The IRC log may be, for example, an IRC log from the IRC log database 401 of FIG. 4. The new identity-theft nomenclature may include, for example, nicknames and email addresses used by participants (e.g., identity thieves) in chat rooms. By way of further example, the new websites may include URLs to websites that are mentioned in chat rooms. In various embodiments, the new identity-theft nomenclature may be utilized by a PWS such as, for example, the PWS 200 of FIG. 2, to search for additional compromised PII as described with respect to FIG. 2.

After the discovery step 401A, an analysis step 402A may occur. In a typical embodiment, the analysis step 402A includes ranking a relative significance of identity-theft websites and forums that are stored, for example, in a database 403A. The identity-theft websites and forums include, for example, the new websites and forums identified at the discovery step 401A. The identity-theft websites and forums may be ranked in a manner similar to that described with respect to the ranking of identity-theft nomenclature in the performance-analysis process 205 of FIG. 2. In a typical embodiment, the analysis step 402A results in storage of the rankings and the new websites in the database 403A. Subsequently, the flow 4000A ends.

Figure 4B:
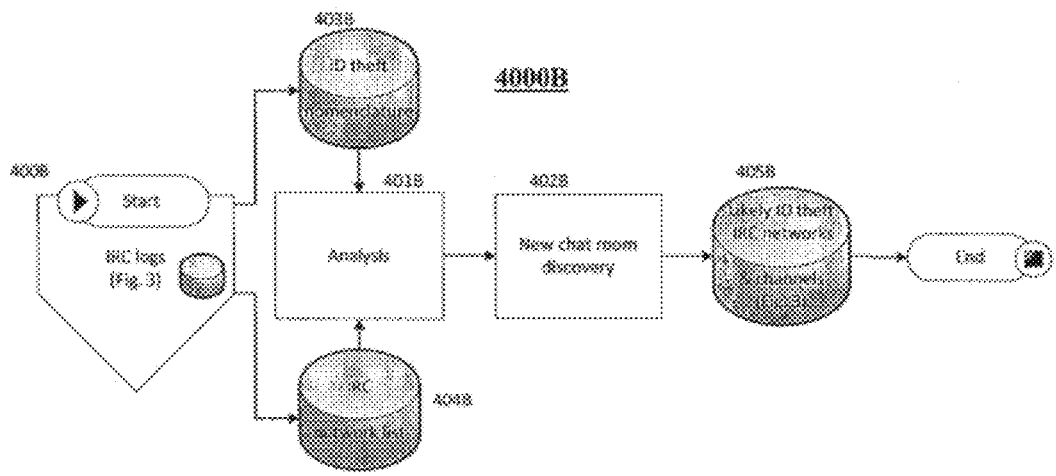
FIG. 4B illustrates a process of chat-room discovery.

FIG. 4B illustrates a flow 4000B for chat-room discovery. In a typical embodiment, the flow 4000B may begin via an IRC bot 400B. In a typical embodiment, the IRC bot 400B is similar to the IRC bot 400A of FIG. 4A, the IRC bot 400 of FIG. 4, the IRC bot 300 of FIG. 3, and the IRC bot 101 of FIG. 1. As described with respect to FIG. 4, the IRC bot 400B may yield IRC logs from monitoring of chat rooms. Additionally, as described with respect to the discovery process 401A of FIG. 4A, in various embodiments, the IRC bot 400B may yield identity-theft nomenclature and identity-theft web sites after engaging in a discovery process. The identity-theft nomenclature and the identity-theft websites may be stored, for example, in a nomenclature database 403B and an IRC-network database 404B.

In a typical embodiment, the IRC logs, the identity-theft nomenclature from the nomenclature database 403B and the chat rooms from the chat-room database 404B may serve as inputs to an analysis step 401B. At the analysis step 401B, the flow 4000B is typically operable to analyze the IRC logs to discover new chat rooms. For example, for a given IRC log, the flow 4000B may analyze a frequency of identity-theft nomenclature. In addition, by way of further example, the flow 4000B may determine how often particular chat rooms are referenced in a given IRC log. In various embodiments, if references to a particular chat room exceed a configurable threshold, the particular chat room may be recorded in a database 405B at step 402B. In some embodiments, the predetermined threshold for overall references may vary based on, for example, a frequency of identity-theft nomenclature in the given IRC log. For example, if the given IRC log has a high frequency of identity-theft nomenclature relative to a configurable value, a single reference may be sufficient for recordation in the database 405B.

In various embodiments, the analysis step 401B may further involve monitoring particular chat rooms from the chat-room database 404B. For example, as described with respect to the analysis step 402A of FIG. 4A, chat rooms in the chat-room database 404B may be ranked. Therefore, in various embodiments, high-ranking chat rooms may be monitored for references to other chat rooms. In a typical embodiment, new chat rooms discovered via the analysis step 401B are stored in the database 405B at step 402B. Subsequently, the flow 4000B ends.

Figure 5:
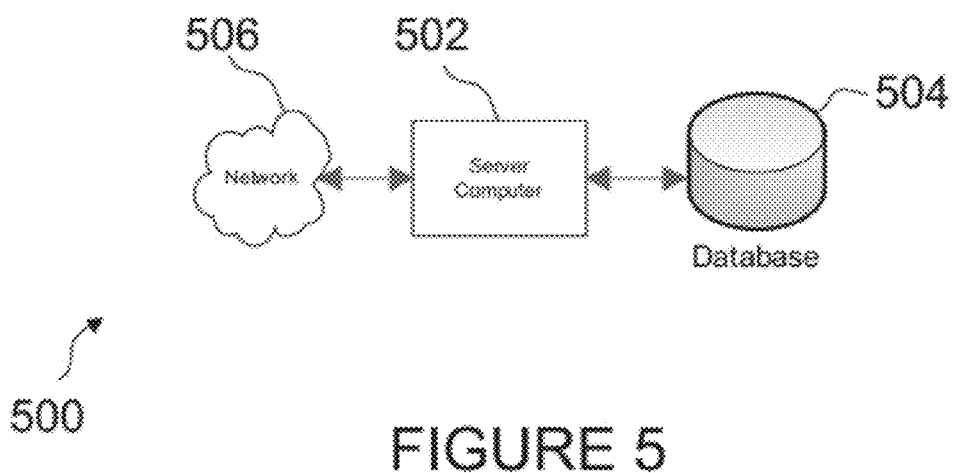
FIG. 5 illustrates a system that may be utilized to facilitate acquisition and utilization of identity-theft information.

FIG. 5 illustrates a system 500 that may be utilized to facilitate acquisition and utilization of identity-theft information. The system 500 includes a server computer 502, a database 504, and a computer network 506. In a typical embodiment, the server computer 502 may have resident and operating thereon a PWS such as, for example, the PWS 200 of FIG. 2. In a typical embodiment, the server computer may have resident and operating thereon an IRC bot such as, for example, the IRC bot 400B of FIG. 4B, the IRC bot 400A of FIG. 4A, the IRC bot 400 of FIG. 4, the IRC bot 300 of FIG. 3, and the IRC bot 101 of FIG. 1. In various embodiments, the server computer 502 may facilitate execution, for example, of the flow 1000 of FIG. 1, the flow 2000 of FIG. 2, the flow 3000 of FIG. 3, and/or the flow 4000 of FIG. 4. In that way, the server computer 502 may be operable to acquire identity-theft information such as, for example, compromised PII, via the computer network 506. The computer network 506 may be, for example, the Internet. The identity-theft information may be stored, for example, in the database 504.

One of ordinary skill in the art will appreciate that the server computer 502 may, in various embodiments, represent a plurality of server computers. For example, the PWS and the IRC bot may, in various embodiments, be resident and operating on distinct physical or virtual server computers Likewise, in various embodiments, the PWS and the IRC bot may be resident and operating on one physical or virtual server computer. Furthermore, one of ordinary skill in the art will appreciate that the database 504 may, in various embodiments, represent either a single database or a plurality of databases.

Figure 6:
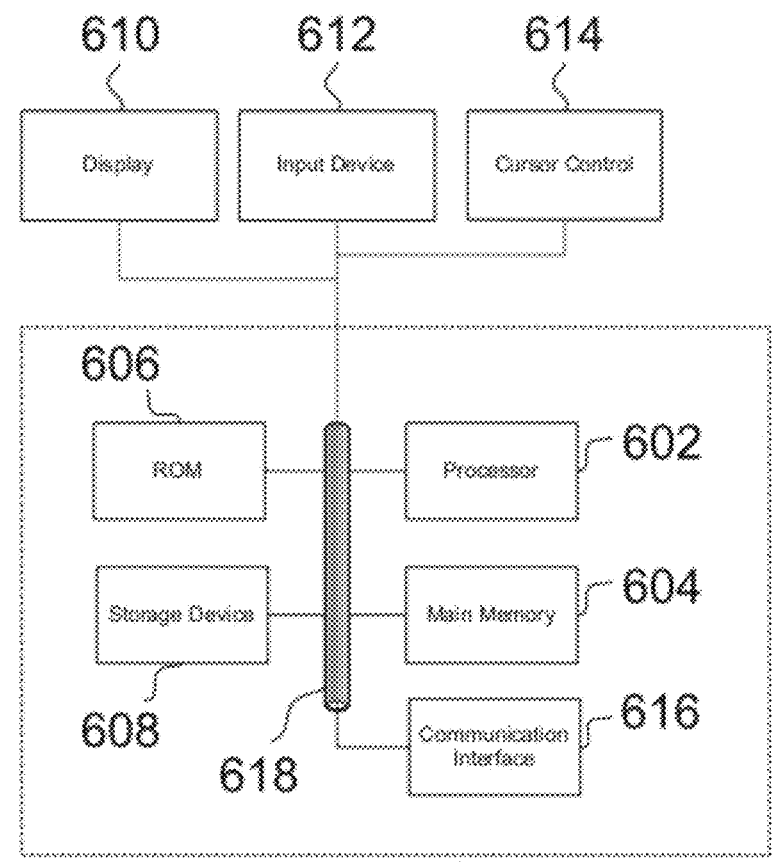
FIG. 6 illustrates an embodiment of a computer system on which various embodiments of the invention may be implemented.

FIG. 6 illustrates an embodiment of a computer system 600 on which various embodiments of the invention may be implemented such as, for example, the PWS 200 of FIG. 2, the IRC bot 400B of FIG. 4B, the IRC bot 400A of FIG. 4A, the IRC bot 400 of FIG. 4, the IRC bot 300 of FIG. 3, and the IRC bot 101 of FIG. 1. The computer system 600 may be, for example, similar to the server computer 502 of FIG. 5. The computer system 600 may be a physical system, virtual system, or a combination of both physical and virtual systems. In the implementation, a computer system 600 may include a bus 618 or other communication mechanism for communicating information and a processor 602 coupled to the bus 618 for processing information. The computer system 600 also includes a main memory 604, such as random-access memory (RAM) or other dynamic storage device, coupled to the bus 618 for storing computer readable instructions by the processor 602.

The main memory 604 also may be used for storing temporary variables or other intermediate information during execution of the instructions to be executed by the processor 602. The computer system 600 further includes a read-only memory (ROM) 606 or other static storage device coupled to the bus 618 for storing static information and instructions for the processor 602. A computer-readable storage device 608, such as a magnetic disk or optical disk, is coupled to the bus 618 for storing information and instructions for the processor 602. The computer system 600 may be coupled via the bus 618 to a display 610, such as a liquid crystal display (LCD) or a cathode ray tube (CRT), for displaying information to a user. An input device 612, including, for example, alphanumeric and other keys, is coupled to the bus 618 for communicating information and command selections to the processor 602. Another type of user input device is a cursor control 614, such as a mouse, a trackball, or cursor direction keys for communicating direct information and command selections to the processor 602 and for controlling cursor movement on the display 610. The cursor control 614 typically has two degrees of freedom in two axes, a first axis (e.g., x) and a second axis (e.g., y), that allow the device to specify positions in a plane.

The term "computer readable instructions" as used above refers to any instructions that may be performed by the processor 602 and/or other component of the computer system 600. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 608. Volatile media includes dynamic memory, such as the main memory 604. Transmission media includes coaxial cables, copper wire, and fiber optics, including wires of the bus 618. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 602 for execution. For example, the instructions may initially be borne on a magnetic disk of a remote computer. The remote computer can load the instructions into its dynamic memory and send the instructions over a telephone line using a modem. A modem local to the computer system 600 can receive the data on the telephone line and use an infrared transmitter to convert the data to an infrared signal. An infrared detector coupled to the bus 618 can receive the data carried in the infrared signal and place the data on the bus 618. The bus 618 carries the data to the main memory 604, from which the processor 602 retrieves and executes the instructions. The instructions received by the main memory 604 may optionally be stored on the storage device 608 either before or after execution by the processor 602.

The computer system 600 may also include a communication interface 616 coupled to the bus 618. The communication interface 616 provides a two-way data communication coupling between the computer system 600 and a network. For example, the communication interface 616 may be an integrated services digital network (ISDN) card or a modem used to provide a data communication connection to a corresponding type of telephone line. As another example, the communication interface 616 may be a local area network (LAN) card used to provide a data communication connection to a compatible LAN. Wireless links may also be implemented. In any such implementation, the communication interface 616 sends and receives electrical, electromagnetic, optical, or other signals that carry digital data streams representing various types of information. The storage device 608 can further include instructions for carrying out various processes for image processing as described herein when executed by the processor 602. The storage device 608 can further include a database for storing data relative to same.

What is claimed is:

1. A method comprising:
    accessing, by a computer system, stored identity-theft nomenclature;
    wherein the stored identity-theft nomenclature comprises a changing set of words and phrases determined to be suggestive of at least one of:
        identity theft; and
        exchange of identity-theft information;
    generating, by the computer system, a search-engine query from the stored identity-theft nomenclature;
    querying, by the computer system, at least one search engine via the search-engine query;
    identifying, by the computer system, at least one new computer-network resource responsive to the querying;
    crawling, by the computer system, the at least one new computer-network resource;
    collecting, by the computer system, identity-theft information from the at least one new computer-network resource;
    processing, by the computer system, the identity-theft information for compromised personally-identifying information (PII); and
    wherein the processing comprises:
        analyzing the identity-theft information for new identity-theft nomenclature; and
        storing any new identity-theft nomenclature with the stored identity-theft nomenclature.

2. The method of claim 1, wherein the collecting comprises scanning the at least one new computer-network resource for at least a portion the stored identity-theft nomenclature.

3. The method of claim 1, wherein the processing comprises extracting compromised PII from the identity-theft information, the extracting comprising recognizing at least one PII format.

4. The method of claim 3, wherein the recognized PII format is selected from the group consisting of: token-separated data, one or more columns of data lacking column headers, multi-line labeled data, and magnetic-stripe data.

5. The method of claim 1, wherein the processing comprises validating the at least one new computer-network resource, the validating comprising determining whether the at least one new computer-network resource is a likely source of false positives for compromised PII.

6. The method of claim 1, wherein the processing comprises normalizing the identity-theft information, the normalizing comprising storing the identity-theft information according to a standardized format.

7. The method of claim 1, comprising creating and delivering at least one of an alert and a report in connection with the identity-theft information.

8. The method of claim 1, wherein the identity-theft information comprises information related to new sources of compromised PII.

9. The method of claim 1, wherein the stored identity-theft nomenclature comprises words that are determined to be suggestive of identity-theft information.

10. The method of claim 1, comprising ranking entries within the stored identity-theft nomenclature according to a relative significance of compromised PII that is gleaned thereby.

11. The method of claim 10, wherein the ranking comprises ranking the stored identity-theft nomenclature according to a quality of compromised PII that is gleaned thereby.

12. The method of claim 10, wherein the ranking comprises ranking the stored identity-theft nomenclature according to a quantity of compromised PII that is gleaned thereby.

13. The method of claim 10, wherein the generating comprises generating the search-engine query from highly-ranked entries from the stored identity-theft nomenclature.

14. The method of claim 1, wherein the at least one new computer-network resource is a chat room.

15. The method of claim 14, wherein the collecting comprises distinguishing spam postings from other dialog.

16. The method of claim 14, wherein the collecting comprises logging chat dialog into a chat log database.

17. The method of claim 16, wherein the processing comprises discovering new chat rooms, the discovering comprising analyzing chat dialogs stored in the chat log database.

18. The method of claim 17, wherein the discovering comprises analyzing a frequency of the stored identity-theft nomenclature in the chat dialogs.

19. The method of claim 18, wherein the discovering comprises determining how often particular chat rooms are referenced in a given chat dialog from the chat log database.

20. The method of claim 19, wherein the discovering comprises, responsive to references to a given chat room exceeding a threshold, recording the given chat room for future crawling.

21. The method of claim 1, wherein the identity-theft information identifies at least one of a chat network and a chat room that is determined likely to relate to identity theft.

22. The method of claim 1, wherein the identity-theft information comprises a uniform resource locator (URL) to a website that is determined likely to relate to identity theft.

23. The method of claim 1, wherein the identity-theft nomenclature comprises non-English words.

24. A computer-program product comprising a non-transitory computer-usable medium having computer-readable program code embodied therein, the computer-readable program code adapted to be executed to implement a method comprising:
    accessing stored identity-theft nomenclature;
    wherein the stored identity-theft nomenclature comprises a changing set of words and phrases determined to be suggestive of at least one of:
        identity theft; and
        exchange of identity-theft information;
    generating a search-engine query from the stored identity-theft nomenclature;
    querying at least one search engine via the search-engine query;
    identifying at least one new computer-network resource responsive to the querying;
    crawling the at least one new computer-network resource;
    collecting identity-theft information from the at least one new computer-network resource;
    processing the identity-theft information for compromised personally-identifying information (PII); and
    wherein the processing comprises:
        analyzing the identity-theft information for new identity-theft nomenclature; and
        storing any new identity-theft nomenclature with the stored identity-theft nomenclature.

* * * * *